United States Patent
Boyles et al.

(10) Patent No.: US 7,290,219 B2
(45) Date of Patent: Oct. 30, 2007

(54) SYSTEM AND METHOD FOR SELECTION BASED ACTION BAR

(75) Inventors: Ryan A. Boyles, Raleigh, NC (US);
Patrick R. Guido, Cary, NC (US);
Niraj P. Joshi, Cary, NC (US); Robert C. Leah, Cary, NC (US); Paul F. McMahan, Apex, NC (US); Richard W. Ragan, Jr., Round Rock, TX (US);
Wayne B. Riley, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 933 days.

(21) Appl. No.: 10/425,048

(22) Filed: Apr. 28, 2003

(65) Prior Publication Data

US 2004/0216055 A1    Oct. 28, 2004

(51) Int. Cl.
*G06F 3/048* (2006.01)

(52) U.S. Cl. .................. 715/810; 715/503; 715/504; 715/808; 715/825

(58) Field of Classification Search ............ 715/503, 715/504, 509, 708, 771, 779, 808, 810, 823, 715/825, 841
See application file for complete search history.

(56) References Cited

U.S. PATENT DOCUMENTS 5,204,947 A    4/1993    Bernstein et al. ........... 395/157

(Continued)

FOREIGN PATENT DOCUMENTS

EP    0627691 A1    12/1994

OTHER PUBLICATIONS

Microsoft, Micorsoft Excel 2000, 1999.*

*Primary Examiner*—Tadesse Hailu
*Assistant Examiner*—Alvin H Tan
(74) *Attorney, Agent, or Firm*—Van Leeuwen & Van Leeuwen; Andre Gibbs

(57) ABSTRACT

A system and method is provided for displaying a selection based action bar to a user that the user is able to use to perform actions using selected data. A user selects one or more displayed selections using a selection device. After the user selections have been made, the system determines which actions can be used with the selected data. Graphical components that correspond to the allowed actions are placed in an action bar and the action bar is displayed proximate to at least one of the user's selections. The action bar is not removed and remains visible as a result of the user scrolling display or performing unrelated actions. Providing a persistent action bar in location proximate to the user's selection helps the user maintain focus on the selected data. In addition, the selection based action bar can be used as a visual placeholder are marking mechanism.

15 Claims, 7 Drawing Sheets

|   | Number | Date | First | Last | Title |
|---|--------|------|-------|------|-------|
| ☐ | 179,312 | Mar 17,2002 | Jill | Estep | Manager |
| ☐ | 179,487 | Apr 22,2002 | Ryan | Willis | Associate |
| ☑ | 179,490 | Apr 25,2002 | Chris | Wright | Sales Representative |
| ☐ | 179,507 | May 12,2002 | Alan | Anderson | Associate |
| ☐ | 179,888 | Aug 22,2002 | Renee | Brown | Associate |
| ☐ | 179,152 | Oct 15,2002 | John | Oswald | Asst. Manager |

U.S. PATENT DOCUMENTS

| | | | |
|---|---|---|---|
| 5,208,910 A | 5/1993 | Higgins et al. | 395/156 |
| 5,588,105 A * | 12/1996 | Foster et al. | 715/779 |
| 5,606,702 A | 2/1997 | Diel et al. | 395/682 |
| 5,778,404 A * | 7/1998 | Capps et al. | 715/531 |
| 6,337,698 B1 * | 1/2002 | Keely et al. | 715/823 |
| 6,593,949 B1 * | 7/2003 | Chew et al. | 715/841 |
| 6,918,091 B2 * | 7/2005 | Leavitt et al. | 715/765 |
| 7,055,110 B2 * | 5/2006 | Kupka | 715/863 |
| 7,058,902 B2 * | 6/2006 | Iwema et al. | 715/810 |
| 7,103,853 B1 * | 9/2006 | Patil | 715/824 |
| 7,119,794 B2 * | 10/2006 | Kong | 345/168 |
| 7,146,562 B2 * | 12/2006 | Janssen | 715/504 |
| 7,158,123 B2 * | 1/2007 | Myers et al. | 345/173 |
| 2004/0100499 A1 * | 5/2004 | Brockway et al. | 345/765 |

* cited by examiner

|  | Number | Date | First | Last | Title |
|---|---|---|---|---|---|
| ☐ | 179,312 | Mar 17,2002 | Jill | Estep | Manager |
| ☐ | 179,487 | Apr 22,2002 | Ryan | Willis | Associate |
| ☐ | 179,490 | Apr 25,2002 | Chris | Wright | Sales Representative |
| ☐ | 179,507 | May 12,2002 | Alan | Anderson | Associate |
| ☐ | 179,888 | Aug 22,2002 | Renee | Brown | Associate |
| ☐ | 179,152 | Oct 15,2002 | John | Oswald | Asst. Manager |

Figure 1A

|  | Number | Date | First | Last | Title |
|---|---|---|---|---|---|
| ☐ | 179,312 | Mar 17,2002 | Jill | Estep | Manager |
| ☐ | 179,487 | Apr 22,2002 | Ryan | Willis | Associate |
| ☑ | 179,490 | Apr 25,2002 | Chris | Wright | Sales Representative |
| ☐ | 179,507 | May 12,2002 | Alan | Anderson | Associate |
| ☐ | 179,888 | Aug 22,2002 | Renee | Brown | Associate |
| ☐ | 179,152 | Oct 15,2002 | John | Oswald | Asst. Manager |

Figure 1B

| 210 | | | | |
|---|---|---|---|---|
| | ☐ | ☐ | ☐ | ☐ |
| Number | 179,312 | 179,487 | 179,490 | 179,507 |
| Date | Mar 17,2002 | Apr 22,2002 | Apr 25,2002 | May 12,2002 |
| First | Jill | Ryan | Chris | Alan |
| Last | Estep | Willis | Wright | Anderson |
| Title | Manager | Associate | Sales Representative | Associate |

| | ☐ | ☐ | ☑ 220 | ☐ |
|---|---|---|---|---|
| Number | 179,312 | 230 — 240 | 179,487 | 179,490 |
| Date | Mar 17,2002 | | Apr 22,2002 | Apr 25,2002 |
| First | Jill | | Ryan | Chris |
| Last | Estep | | Willis | Wright |
| 130 Title | Manager | Edit / Show Department / Delete | Associate | Sales Representative |

SYSTEM AND METHOD FOR SELECTION BASED ACTION BAR

BACKGROUND OF THE INVENTION

1. Technical Field

The present invention relates in general to a system and method for providing an action bar in a location proximate to a user selection.

2. Description of the Related Art

A primary purpose of computer systems is to retrieve and display data to users to allow the users the ability to act upon the data. Data is displayed on display screens, ranging from small displays included in devices such as personal digital displays (PDAs) to very large displays used to display large amounts of data. In addition, resolutions on modern displays has increased dramatically, with higher resolutions allowing more data to be displayed in smaller area.

User interfaces, such as tables and trees, are often used to display large quantities of data. Traditional display objects are challenged by their inability to quickly and effectively display available actions that pertain to the user selection. Users are often forced to scroll the data on the screen, perform numerous actions, and visually identify user interface components, such as icons, that pertain to data show the screen. This challenge is exacerbated when the user interfaces are separated from the data selected by the user. This is exceedingly so when the user is using a display with a small font size, allowing more rows or columns of data to be between the user selection and the user interface components.

What is needed, therefore, is a system and method for displaying an action bar in a location proximate to users selection. In addition, what is needed is a system and method for displaying those user interface controls that can be applied to a particular selection.

SUMMARY

A system and method for addressing the aforementioned challenges is provided. A user selects one or more displayed selections using a selection device, such as a keyboard, mouse, trackball, or the like. After the user selections have been made, the system determines which actions can be used with the selected data. Graphical components, such as icons, that correspond to the allowed actions are placed in an action bar. The action bar is displayed proximate to at least one of the user's selections. In a row-based implementation, the selection based action bar is placed above one of the user's selections, so that the user can quickly see which actions can be applied to the selected data. Likewise, in a column-based implementation, the selection based action bar is placed either left or right of one of the user's selections, so that the user can quickly see which actions can be applied to the column of data. The user can perform multiple actions using the selected data by choosing multiple graphical components from the selection based action bar.

The action bar is not removed and remains visible as a result of the user scrolling display or performing unrelated actions. Providing a persistent action bar in location proximate to the user's selection helps the user maintain focus on the selected data. In addition, the selection based action bar can be used as a visual placeholder are marking mechanism.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 1A is a screen diagram of a row-based implementation of the invention prior to the insertion of the selection based action bar;

FIG. 1B is a screen diagram of a row-based implementation of the invention after insertion of the selection based action bar;

FIG. 2A is a screen diagram of a column-based implementation of the invention prior to the insertion of the selection based action bar;

FIG. 2B is a screen diagram of a column-based implementation of the invention after insertion of the selection based action bar;

DETAILED DESCRIPTION

Figure 3:
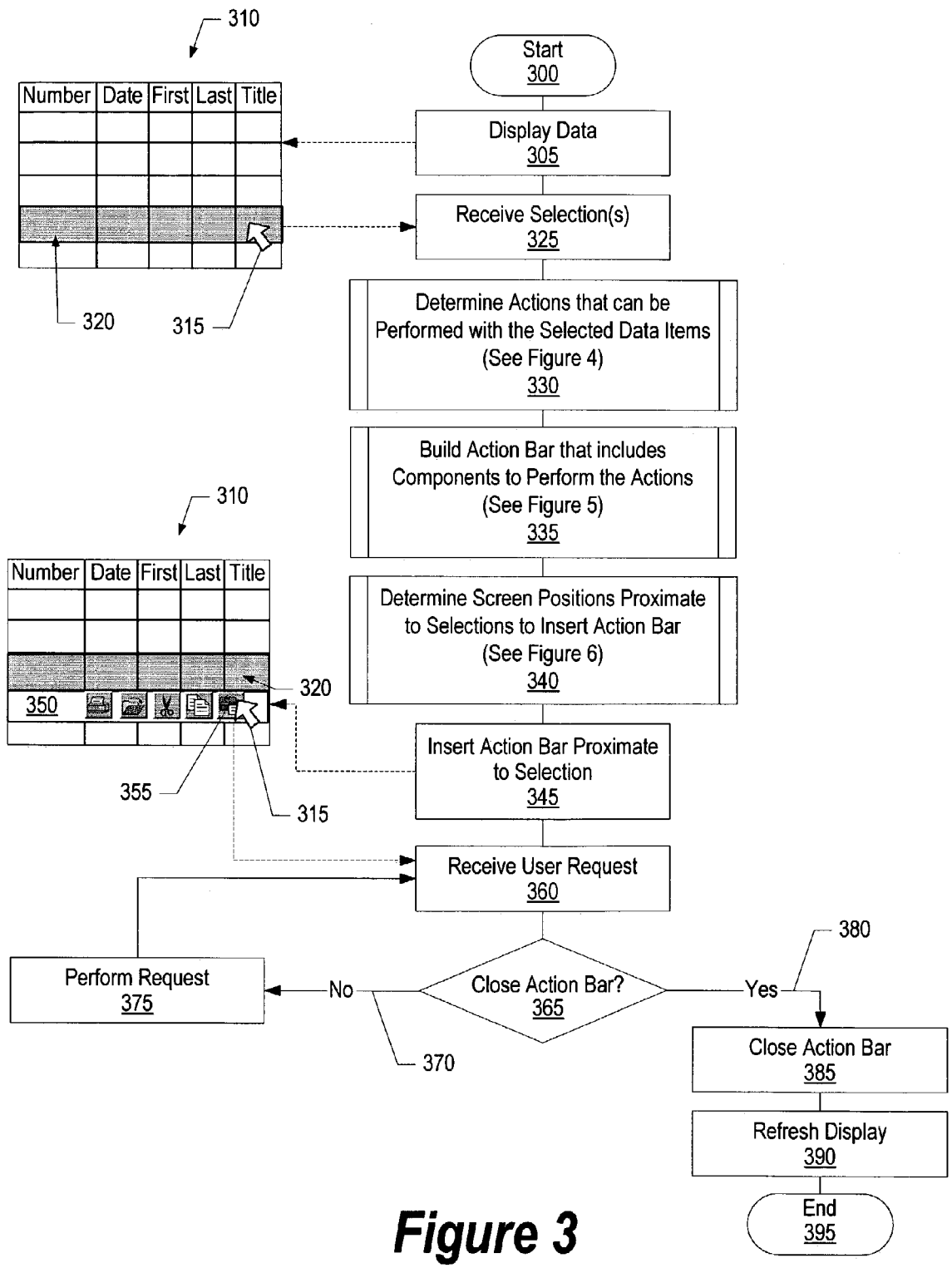
FIG. 3 is a high-level flowchart showing the steps taken to display the selection based action bar and retrieve a user request.

The following is intended to provide a detailed description of an example of the invention and should not be taken to be limiting of the invention itself. Rather, any number of variations may fall within the scope of the invention, which is defined in the claims following the description.

FIG. 1A is a screen diagram of a row-based implementation of the invention prior to the insertion of the selection based action bar. Screen display 100 includes a number of rows and columns for displaying data to a user. In the example shown, data regarding employees is displayed. The employee data includes an employee number, the date the employee was hired, the employee's first name, the employee's last name, and the employee's job title. The user selects which rows of data he would like to perform actions upon by selecting the desired rows. In one embodiment, the desired rows are selected by the user placing a check mark in one or more check mark fields 110. In another embodiment, the user selects the desired rows by simply selecting one or more rows using a pointer, such as a mouse.

FIG. 1B is a screen diagram of a row-based implementation of the invention after insertion of the selection based action bar. Screen display 100 which was first shown in FIG. 1A, shows a result of the user selecting one of the rows. Row 125 has been selected, indicated by check mark 120 that was placed by the user in check mark field 110 corresponding to row 125.

As a result of the user selecting row 125, selection based action bar 130 has been inserted in display and appears adjacent to the selected row. Selection based action bar 130 includes icons 140. In one embodiment, icons 140 are context sensitive. In other words, the individual icons that appear correspond to only those actions that can be performed using the data in the selected row. In addition, the selected rows can be highlighted so that the user easily recognizes the rows are being acted upon. Displaying the selection based action bar in a position adjacent to the selected row provides the user with a visual cue has to the location of the selected row.

FIG. 2A is a screen diagram of a column-based implementation of the invention prior to the insertion of the selection based action bar. Screen display 200 includes a number of rows and columns for displaying data to a user. In the example shown, data regarding employees is displayed. The employee data shown in the example for FIG. 2A is the same data that we shown in the example for FIG. 1A, however the data shown in FIG. 2A is displayed in a columnar format, rather than a row based format. In FIG. 2A, the user selects which columns of data he would like to perform actions upon by selecting the desired columns. In one embodiment, the desired columns are selected by the user placing a check mark in one or more check mark fields 210. In another embodiment, the user selects the desired columns by simply selecting one or more columns using a pointer, such as a mouse.

FIG. 2B is a screen diagram of a column-based implementation of the invention after insertion of the selection based action bar. Screen display 200 which was first shown in FIG. 2A, shows a result of the user selecting one of the columns. Column 225 has been selected, indicated by check mark 220 that was placed by the user in check mark field 210 corresponding to column 225.

As a result of the user selecting column 225, selection based action bar 230 has been inserted in display and appears adjacent to the selected column. Selection based action bar 230 includes icons 240. In one embodiment, icons 240 are context sensitive, as described above in FIG. 1B. In addition, similarly to the rows described in FIG. 1B, the selected columns in FIG. 2B can be highlighted so that the user easily recognizes the columns are being acted upon. Displaying the selection based action bar in a position adjacent to the selected column provides the user with a visual cue has to the location of the selected column.

FIG. 3 is a high-level flowchart showing the steps taken to display the selection based action bar and retrieve a user request. Processing commences at 300 whereupon, and step 305, data is displayed to the user on display screen 310. Display screen 305 includes selectable rows and/or columns 320. Display screen 305 also includes pointer icon 315 that is manipulated by the user using a keyboard, mouse, trackball, or other selection device. While display screen 310 a shown as a row based implementation, a column based implementation, a shown in FIGS. 1A and 1B could also be used.

After the user has selected one or more selections, processing receives the user selections at step 325. The actions that can be performed using the selected data items are determined (predefined process 330, see FIG. 4 for processing details). The selection based action bar that includes components, such as icons, corresponding to the identified actions is then created (predefined process 335, see FIG. 5 for processing details). Next, a screen position that is proximate to the selected data is determined (predefined process 340, see FIG. 6 for processing details).

Selection based action bar 350 is inserted in a location proximate to the user's selection (step 345). Selection based action bar 350 includes graphical components, such as icon 355, that can be selected by the user to perform an action. For example, the user can select an icon to copy or print the selected record or records.

The user's request is received at step 360. A determination is made has to whether the user has requested to close the selection based action bar (decision 365). If the user's request is not to close the selection based action bar, decision 365 branches to "no" branch 370 whereupon the action corresponding to the graphical component is performed (step 375) and processing loops back to receive the user's next request. This looping continues until the user request to close the selection based action bar, at which point decision 365 branches to "yes" branch 380.

The user has requested to close the action bar, the action bar is removed from the display screen (step 385), and the display screen is refreshed so that the data is no longer separated by the selection based action bar (step 390). Processing thereafter ends at 395.

Figure 4:
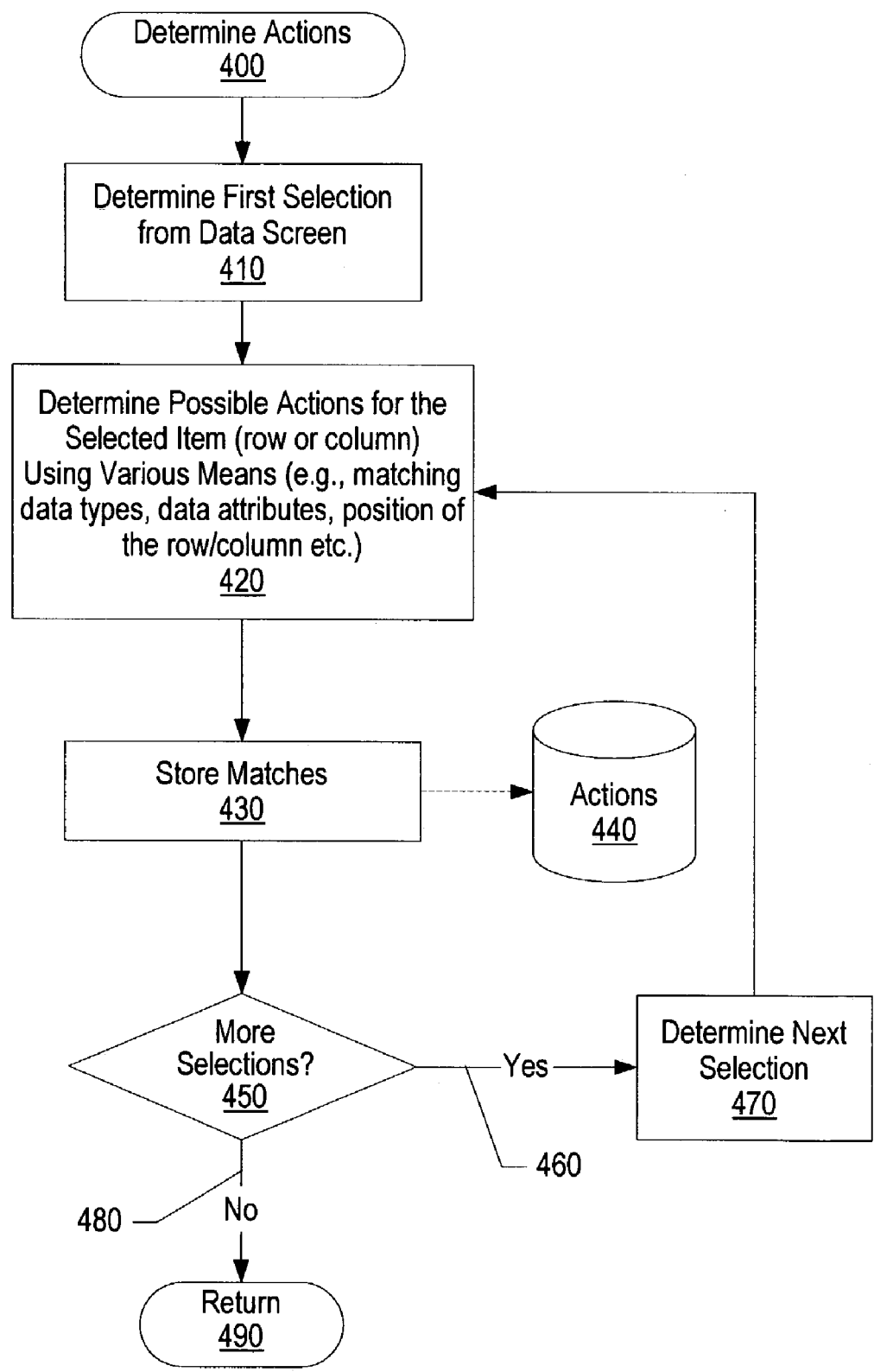
FIG. 4 is a flowchart showing the steps taken to determine the actions to be made available from the selection based action bar.

FIG. 4 is a flowchart showing the steps taken to determine the actions to be made available from the selection based action bar. Processing commences at 400 whereupon the first selection made by the user on the display screen is identified (step 410). The actions that are able to be performed for the selected items are determined (step 420). Various means can be used to determine the actions that are available to a particular selection. For example, in the example employee application shown in FIGS. 1A-2B certain actions may be available based upon the job title of a particular employee. Using this example, when a manager is selected actions relating to the manager's department may be available, however if a salesperson's selected marketing for sales actions may instead be available. The identified matches are stored in actions store 440, which may be physically stored in random access memory (RAM) or stored on a nonvolatile storage device (step 430).

A determination is made has to whether there are more selections (i.e., rows or columns) that were made by the user (decision 450). If there are more selections, decision 450 branches to "yes" branch 460 whereupon the next selection is identified (step 470) and processing loops back to determine which actions are valid for the newly identified selection. In one embodiment, only actions that are common to each of the selections are provided through the selection based action bar. In another embodiment, actions that are applicable to any of the selections are provided through the selection based action bar and, upon selection by the user, are only performed using the selections for which they apply. This looping continues until all the user's selections have been processed, at which point decision 450 branches to "no" branch 480 whereupon processing returns at 490.

Figure 5:
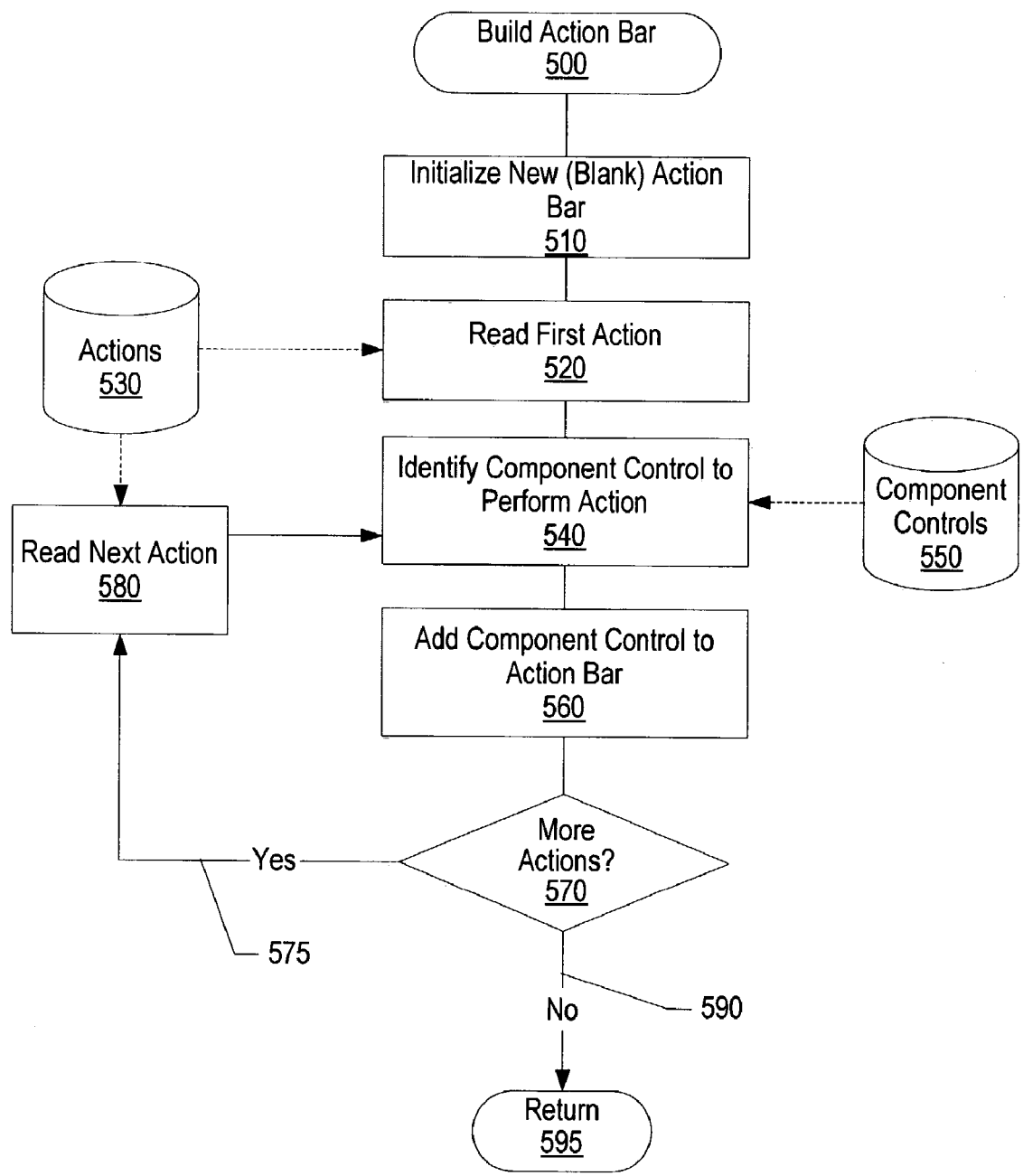
FIG. 5 is a flowchart showing the steps taken to build the action bar using the identified actions.

FIG. 5 is a flowchart showing the steps taken to build the action bar using the identified actions. Processing commences at 500 whereupon a new (i.e., blank) selection based action bar is initialized (step 510). The first action that was identified using the step shown in FIG. 4 is read (step 520) from actions data store 530. A component control, such as an icon, corresponding to the action is identified (step 540) by matching the action with component controls stored in component control data store 550. The graphical component control is added to the selection based action bar (step 560).

A determination is made has to whether there are more actions that were stored in actions data store 530 (decision 570). If there are more actions, decision 570 branches to "yes" branch 575 whereupon the next action is read from actions data store 530 (step 580) and processing loops back to identify the component control and add it to the selection based action bar. This looping continues until all actions stored in the actions data store have been processed, at which point decision 570 branches to "no" branch 590 and processing returns at 595.

Figure 6:
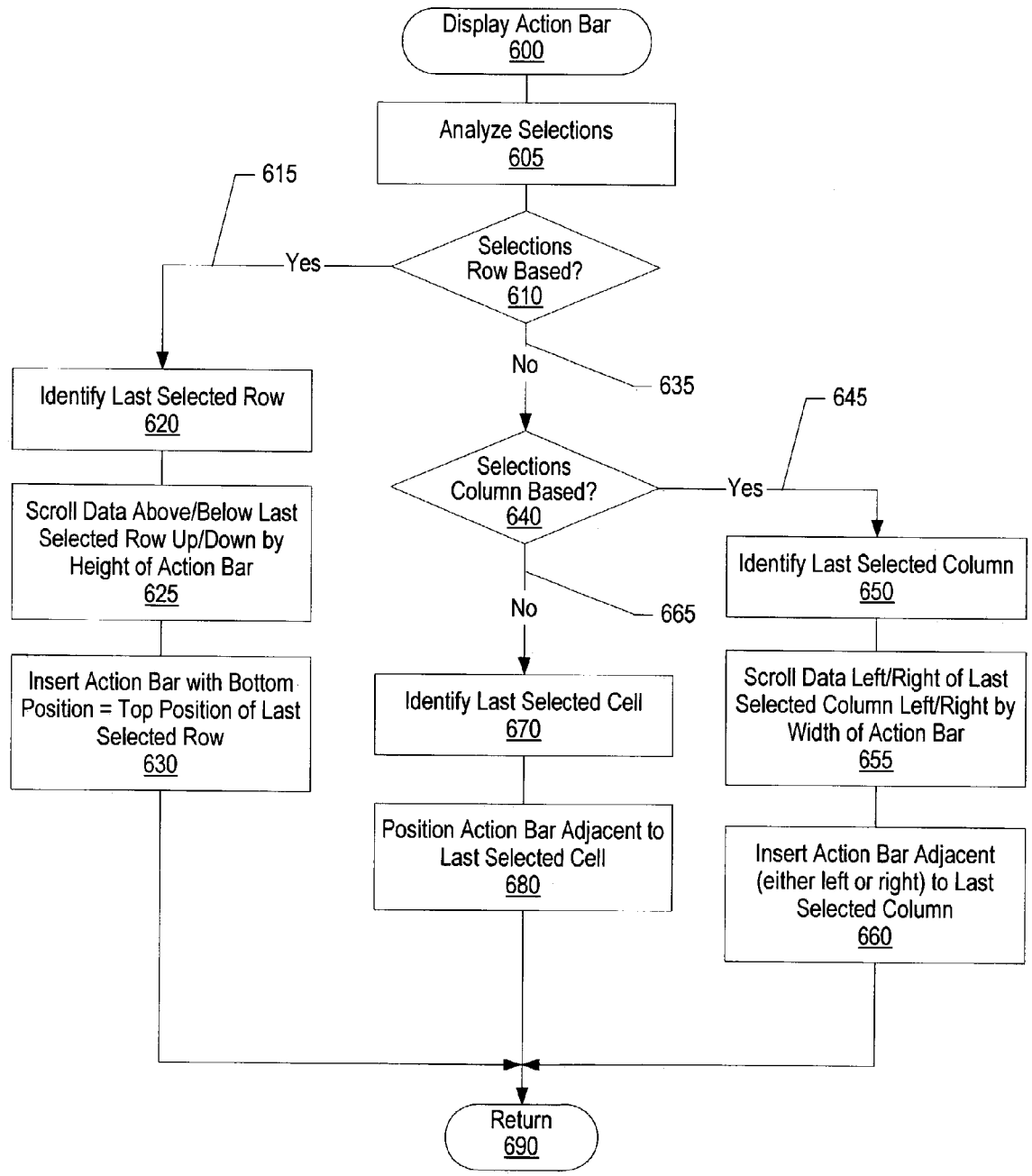
FIG. 6 is a flowchart showing the steps taken to display the selection based action bar.

FIG. 6 is a flowchart showing the steps taken to display the selection based action bar. Processing commences at 600 whereupon the selections chosen by the user are analyzed (step 605). A determination is made has to whether the selections made by the user are row-based selections (decision 610). If the selections are row based, decision 610 branches to "yes" branch 615 whereupon the last selected row is identified (step 620). The data above or below the identified last selected row is scrolled either up or down in order to make room for the action bar (step 625). The distance the data is scrolled is equal to or greater than the height of the selection based action bar is being inserted. The selection based action bar is inserted proximate to the last selected row so that the bottom of the selection based action bar is directly above the last selected row (step 630) and processing returns at 690.

Returning to decision 610, if the selections are not row based, decision 610 branches to "no" branch 635 whereupon another determination is made has to whether the selections made by the user are columns-based selections (decision 640). If the selections are columns based, decision 640 branches to "yes" branch 645 whereupon the last selected column is identified (step 650). The data to the left or right of the last selected column is shifted, or scrolled, left or right in order to make room for the columnar-based action bar (step 655). The distance the data shifted is equal to or greater than the width of the columnar-based action bar. In one embodiment, the selection based action bar is placed to the left of the selection when the user is using a language that reads left-to-right, and placed to the right of the selection when the user is using a bi-directional language that reads right to left. The selection based action bar is inserted in a position adjacent to the last selected column (step 660) and processing returns at 690.

Returning to decision 640, if the selections are not row based or column based, decision 640 branches to "no" branch 665 whereupon the last selected cell is identified (step 670) and the selection based action bar is displayed in a position adjacent to the last selected cell and processing returns at 690.

Figure 7:
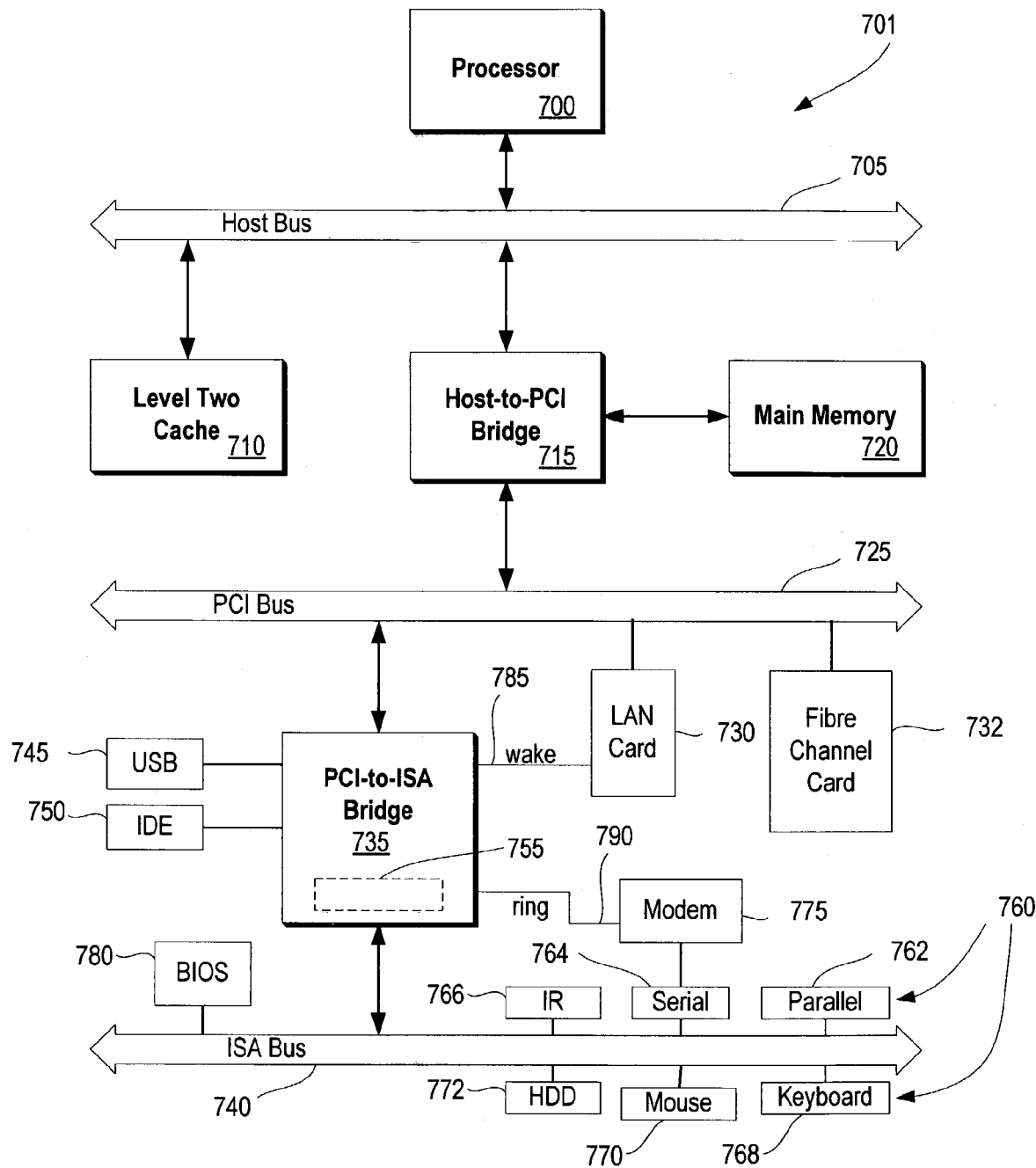
FIG. 7 is a block diagram of a computing device capable of implementing the translation of normalized position settings to vehicle-specific settings and vice-versa.

FIG. 7 illustrates information handling system 701 which is a simplified example of a computer system capable of performing the systems and methods described herein. Computer system 701 includes processor 700 that is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (FDD) 772 coupled to ISA bus 740. Alternatively, many I/O devices can be accommodated by a super I/O controller (not shown) attached to ISA bus 740.

BIOS 780 is coupled to ISA bus 740 and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 another computer system to copy files over a network, LAN card 730 is coupled to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for providing a selection based action bar in a software application, said method comprising:
   receiving a user request for the selection based action bar;
   identifying one or more user selected records in the software application;
   creating the selection based action bar in response to receiving the request, the action bar including controls for actions adapted to perform using one or more of the user selected records;
   determining whether the user selected records are displayed in a row-based or a column-based format;
   upon determining that the user selected records are displayed in the row-based format, displaying the selection based action bar by performing the following:
      scrolling a last user selected record by a distance equal to or greater than a height of the selection based action bar;
      determining a location of the selection based action bar in a position directly above the last user selected record; and
      inserting the selection based action bar, wherein a bottom position of the selection based action bar is equal to a top position of the last user selected record; and
   upon determining that the user selected records are displayed in the column-based format, displaying the selection based action bar by performing the following:
      scrolling a last user selected record by a distance equal to or greater than a width of the selection based action bar;
      determining a location of the selection based action bar in a position directly adjacent to the last user selected record; and
      inserting the selection based action bar, wherein a first side position of the selection based action bar is equal to a second side position of the last user selected record.

2. The method of claim 1 wherein the user selected records are displayed in the column-based format, the determining the location of the selection based action bar further comprising:
   determining the location of the selection based action bar in a position either directly left or right of the last user selected record.

3. The method of claim 2 wherein determining the location of the selection based action bar further comprises:
   identifying whether a national language being used by a user is a bi-directional language.

4. The method of claim 1 further comprising:
   identifying one or more permitted actions corresponding to the user selected records;
   retrieving graphical controls associated with the identified permitted actions; and
   including the retrieved graphical controls in the selection based action bar.

5. The method of claim 1 further comprising:
   receiving a second user request to close the selection based action bar;
   removing the selection based action bar from the determined location in response to the second user request; and
   refreshing a display screen following the removal of the selection based action bar.

6. An information handling system comprising:
   one or more processors;
   a memory accessible by the processors;
   a nonvolatile storage device accessible by the processors and adapted to read a removable storage medium;
   a software application running on the memory and stored in the memory;
   a display screen for displaying records shown by the software application; and
   an action bar tool for providing a selection based action bar in the software application, including:
      receiving logic for receiving a user request for the selection based action bar;
      identification logic for identifying one or more user selected records in the software application;
      rendering logic for creating the selection based action bar in response to receiving the request, the action bar including controls for actions adapted to perform using one or more of the user selected records;
      determination logic for determining whether the user selected records are displayed in a row-based or a column-based format;
      first display logic for displaying the selection based action bar upon determining that the user selected records are displayed in the row-based format, the first display logic including:
         scrolling logic for scrolling a last user selected record by a distance equal to or greater than a height of the selection based action bar;
         determination logic for determining a location of the selection based action bar in a position directly above the last user selected record; and
         insertion logic for inserting the selection based action bar,
         wherein a bottom position of the selection based action bar is equal to a top position of the last user selected record; and
      second display logic for displaying the selection based action bar upon determining that the user selected records are displayed in the column-based format, the second display logic including:
         scrolling a last user selected record by a distance equal to or greater than a width of the selection based action bar;
         determination logic for determining a location of the selection based action bar in a position directly adjacent to the last user selected record; and
         insertion logic for inserting the selection based action bar,
         wherein a first side position of the selection based action bar is equal to a second side position of the last user selected record.

7. The information handling system of claim 6 wherein the user selected records are displayed in the column-based format, the determination logic for determining a location of the selection based action bar further comprising:
   logic for determining the location of the selection based action bar in a position either directly left or right of the last user selected record.

8. The information handling system of claim 7 further comprising:
   identification logic for identifying whether a national language being used by a user is a bi-directional language.

9. The information handling system of claim 6 further comprising:
   identification logic for identifying one or more permitted actions corresponding to the user selected records;
   retrieval logic for retrieving graphical controls associated with the identified permitted actions; and container manipulation logic for including the retrieved graphical controls in the selection based action bar.

10. The information handling system of claim 6 further comprising:
receiving logic for receiving a second user request to close the selection based action bar;
display logic for removing the selection based action bar from the determined location in response to the second user request; and
display logic for refreshing the displaying screen following the removal of the selection based action bar.

11. A computer program product stored in a computer storage media, the computer storage media containing instructions for execution by a computer, which, when executed by the computer, cause the computer to implement a method for providing a selection based action bar in a software application, said method comprising:
receiving a user request for the selection based action bar;
identifying one or more user selected records in the software application;
creating the selection based action bar in response to receiving the request, the action bar including controls for actions adapted to perform using one or more of the user selected records;
determining whether the user selected records are displayed in a row-based or a column-based format;
upon determining that the user selected records are displayed in the row-based format, displaying the selection based action bar by performing the following:
scrolling a last user selected record by a distance equal to or greater than a height of the selection based action bar;
determining a location of the selection based action bar in a position directly above the last user selected record; and
inserting the selection based action bar, wherein a bottom position of the selection based action bar is equal to a top position of the last user selected record; and
upon determining that the user selected records are displayed in the column-based format, displaying the selection based action bar by performing the following:
scrolling a last user selected record by a distance equal to or greater than a width of the selection based action bar;
determining a location of the selection based action bar in a position directly adjacent to the last user selected record; and
inserting the selection based action bar, wherein a first side position of the selection based action bar is equal to a second side position of the last user selected record.

12. The computer program product of claim 11 wherein the user selected records are displayed in the column-based format, the determining the location of the selection based action bar further comprising:
determining the location of the selection based action bar in a position either directly left or right of the last user selected record.

13. The computer program product of claim 12 wherein determining the location of the selection based action bar further comprises:
means for identifying whether a national language being used by a user is a bi-directional language.

14. The computer program product of claim 11 further wherein the method further comprises:
identifying one or more permitted actions corresponding to the user selected records;
retrieving graphical controls associated with the identified permitted actions; and
including the retrieved graphical controls in the selection based action bar.

15. The computer program product of claim 11 wherein the method further comprises:
receiving a second user request to close the selection based action bar;
removing the selection based action bar from the determined location in response to the second user request; and
refreshing a display screen following the removal of the selection based action bar.

* * * * *